(12) United States Patent
Jin

(10) Patent No.: US 6,671,327 B1
(45) Date of Patent: Dec. 30, 2003

(54) TURBO TRELLIS-CODED MODULATION

(75) Inventor: Gary Q. Jin, Kanata (CA)

(73) Assignee: Zarlink Semiconductor Inc., Kanata (CA)

( * ) Notice: Subject to any disclaimer, the term of this patent is extended or adjusted under 35 U.S.C. 154(b) by 0 days.

(21) Appl. No.: 09/562,322

(22) Filed: May 1, 2000

(51) Int. Cl.$^7$ .............................. H04L 23/02; H04L 5/12
(52) U.S. Cl. ...................... 375/265; 375/222; 375/260; 714/792
(58) Field of Search .................. 375/265; 714/792, 714/810

(56) References Cited

U.S. PATENT DOCUMENTS

| | | | | |
|---|---|---|---|---|
| 5,390,198 A | * | 2/1995 | Higgins ...................... | 714/796 |
| 6,088,387 A | * | 7/2000 | Gelblum et al. ............. | 375/222 |
| 6,249,544 B1 | * | 6/2001 | Azazzi et al. ................ | 375/233 |
| 6,374,386 B1 | * | 4/2002 | Kim et al. ................... | 714/786 |
| 6,473,878 B1 | * | 10/2002 | Wei ............................. | 714/755 |

FOREIGN PATENT DOCUMENTS

WO  98/25384 A2  6/1998

OTHER PUBLICATIONS

Woodard, J. P., Implementation of High Rate Turbo Decoders for Third Generation Mobile Communications, IEE Colloquium on Turbo Codes in Digital Broadcasting, on pp. 21/1–12/6, Nov. 22, 1999.*

* cited by examiner

*Primary Examiner*—Don N. Vo
*Assistant Examiner*—Qutub Ghulamali
(74) *Attorney, Agent, or Firm*—Marks & Clerk

(57) ABSTRACT

In a method of transmitting data over a communications channel, at least some of the bits of an incoming bit stream are passed through a turbo encoder to generate turbo encoded output bits, and words corresponding to symbol points on a constellation in a trellis code modulation scheme are generated using at least the bits passed through the turbo encoder, possibly in conjunction with other bits that are not passed the through the turbo encoder. Typically, the turbo encoded bits are the least significant bits.

15 Claims, 4 Drawing Sheets

US 6,671,327 B1

TURBO TRELLIS-CODED MODULATION

FIELD OF INVENTION

This invention relates to the field of data transmission, and in particular to a modulation scheme for transmitting data over a communication channel, for example, in a discrete multi-tone modulation system.

BACKGROUND OF THE INVENTION

In order to increase the efficiency of data transfer over a communications channel, the data is transferred as symbols, each representing a number of bits. For example, in a QAM (Quadrature amplitude modulation) system, the symbols are represented by the amplitude and phase of the signals. Sixteen unique symbols, i.e. combinations of amplitude and phase, for example, will represent four bits at time. The symbols form a constellation of points on a phase amplitude diagram. As the number of symbols increases, so does the possibility for transmission errors. Forward error coding schemes are employed to permit the receiver to detect errors and recover the correct transmitted symbol.

A preferred form of coding in data communications is convolutional coding, which is a bit level encoding scheme which depends on the preceding bit sequence. In Trellis coded modulation, the number of symbols is increased to provide redundancy. Only certain transitions are allowed. In the event of an error, the receiver can detect the most likely correct transition with a knowledge of all possible allowed transitions.

Unlike block codes, which send data in predetermined blocks, convolutional codes do not cope well with burst errors. Partly, in answer to this problem, turbo codes have been developed. In essence, turbo code consists of two or more convolutional constituent codes separated by an interleaver acting on the input sequence of the first encoder. See for example, "Application of Turbo Codes for Discrete Multi-Tone Modulation", Hamid R. Sadjapour, AT&T Shannon Labs., 1996.

Turbo code is attracting more and more interest due to its larger coding gain. In a DSL (Digital Subscriber Line) system, turbo code has been used to replace trellis code to get better Bit-Error Rate (BER) performance. However, when the constellation size increases, the coding gain advantage of turbo code starts to fall odd. This is because the redundant bits make the constellation size even larger.

An object of this invention is to increase the data transmission rate, for example, in a DMT system.

SUMMARY OF THE INVENTION

According to the present invention there is provided a method of transmitting data over a communications channel, comprising receiving an incoming bit stream, passing at least some of said bits through a turbo encoder to generate turbo encoded output bits, and generating words corresponding to symbol points on a constellation in a trellis code modulation scheme using at least said bits passed through said turbo encoder.

In this invention, the turbo coder is preferably used to code only the least significant bit (LSB) in the constellation since the LSB is most sensitive to errors. The achievable data rate by this means is only a couple of dB away from Shannon capacity. The invention combines powerful turbo code with a trellis-coded modulation scheme to increase the data rate, preferably in a DMT (Discrete Multi-tone) system.

In a DMT system, multi-subchannels are used to transmit data, each with different carriers and different QAM constellations containing different numbers of bits per constellation point. Normally, the number of bits at each constellation point is an integer and a subchannel is unusable if it cannot support one data bit. In accordance with the invention, a spread spectrum algorithm can be combined with turbo trellis-coded modulation so that channels which carry less than one bit of information can also be used. As a result, the overall channel capacity can be increased greatly.

BRIEF DESCRIPTION OF THE DRAWINGS

The invention will now be described in more detail, by way of example only, with reference to the accompanying drawings, in which.

DETAILED DESCRIPTION OF THE PREFERRED EMBODIMENTS

The invention will be described in the context of a DMT (Discrete Multitone System), which might typically contain 1000 sub-channels, each capable of carrying a different number of symbols representing a distinct number of bits, i.e. the number of constellation points for each sub-channel can vary, and thus the number of bits per constellation point can vary.

Encoder

Figure 1:
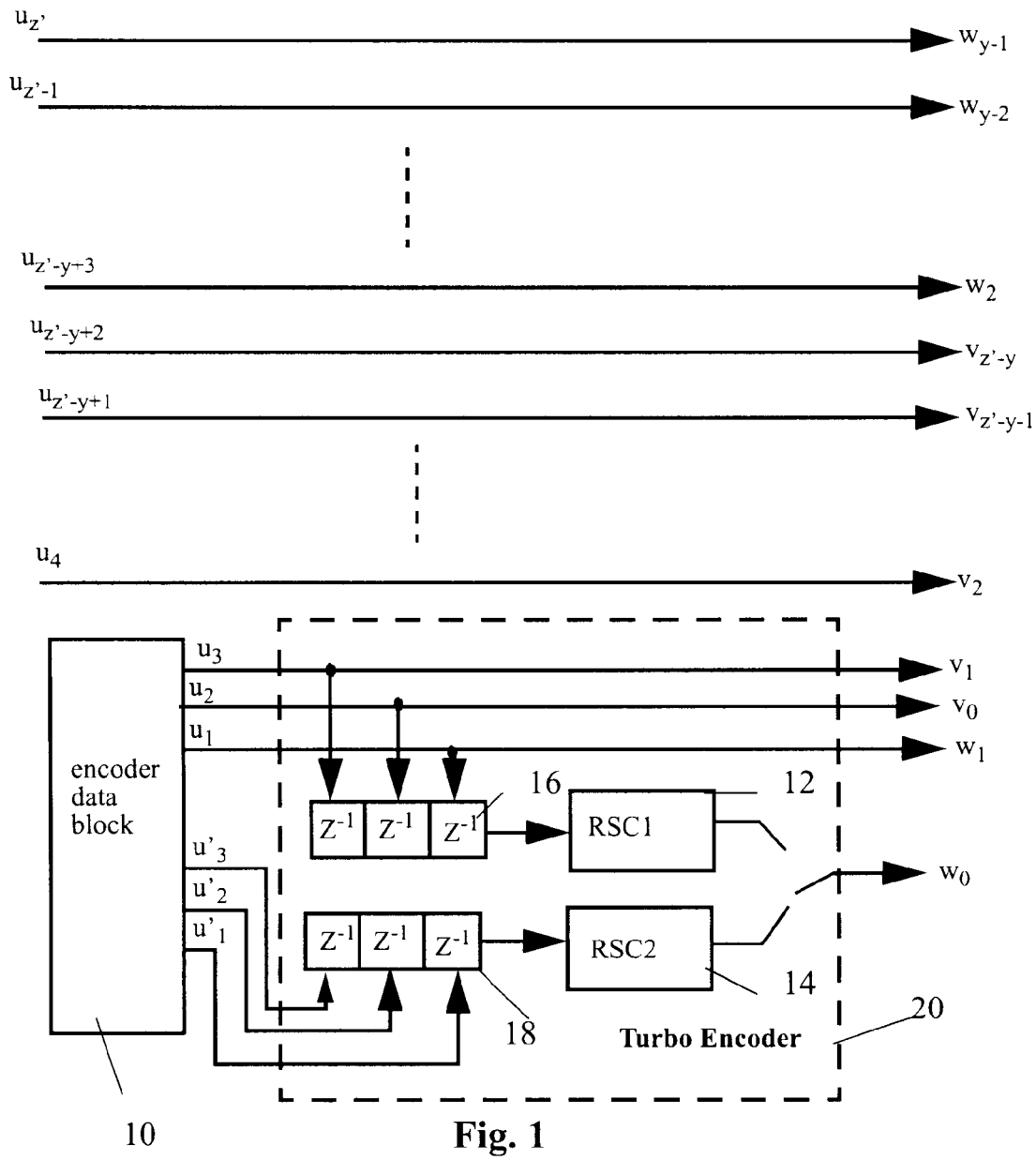
FIG. 1 shows an encoder in accordance with the principles of the invention for x and y>1, where x and y are the number of bits in each constellation point (symbol)

As shown in FIG. 1, a portion of an incoming bit stream is fed to encoder data block 10, which is an addressable memory. Assuming 10 bits per symbol, including one check bit per two subchannels, the 1000 channels can carry 9500 bits at a time. Thus, typically 9500 bits of an incoming bit stream are fed into the encoder. A fraction of these, typically 1,500, are fed to the encoder data block 10.

The encoder may preferably be implemented as a parallel encoder as described in our co-pending application No. 09/562,352 of even date herewith, the contents of which are herein incorporated by reference.

In the example shown, three bits $u_1$, $u_2$, $u_3$ are output sequentially from the encoder data block 10, and three bits, $u'_1$, $u'_2$, $u'_3$ are output as interleaved data. The data bits $u_2$, and $u_3$, form components $v_0$, $v_1$ of the first output word v, and the bit $u_1$ forms the bit $w_1$ of the second output word w. The bit $w_0$ is formed by turbo encoding the groups of bits $u_1$, $u_2$, $u_3$, and $u'_1$, $u'_2$, $u'_3$ with recursive systematic convolutional encoders 12, 14 after passing through respective shift registers 16, 18.

The constellation encoder structure employed is similar to that used in an ADSL system. The binary word $u=(u_{z'}, u_{z'-1}, \ldots, u_1)$ determines two binary words $v=(v_{z'-y}, \ldots, v_0)$ and $w=(w_{y-1}, \ldots, w_0)$ (where $z'=x+y-1$), which are used to look up two constellation points (each contains x and y bits respectively) in the encoder look-up table.

FIG. 1 shows the encoder structure for x>1 and y>1, where the turbo encoder used is a systematic encoder with coding rate ¾ punctured at rate ½. The turbo encoder 20 consists of the two recursive systematic convolutional encoders 12, 14 (RSC1 and RSC2). Encoder RSC1 takes sequential data from the encoder data block 10 and encoder RSC2 takes interleaved data from the same data block 10.

Figure 4:
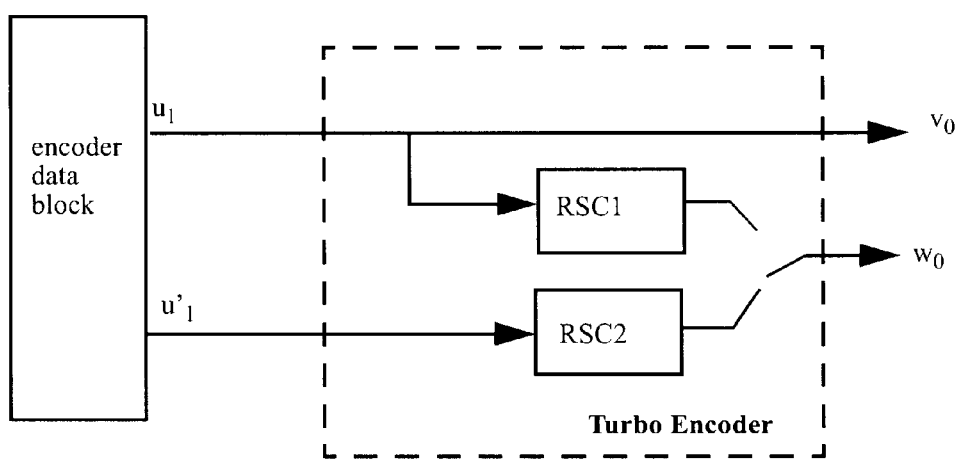
FIG. 4 shows the encoder for x=y=1, where the coding rate is $\frac{1}{2}$.

The length of data block depends on the number of data being transmitted in each signal frame, 9500 bits in the example given above. Normally, an integer number of data blocks will be transmitted in each signal frame FIGS. 2 to 4 show the encoder structure for other values of x and y.

Figure 2:
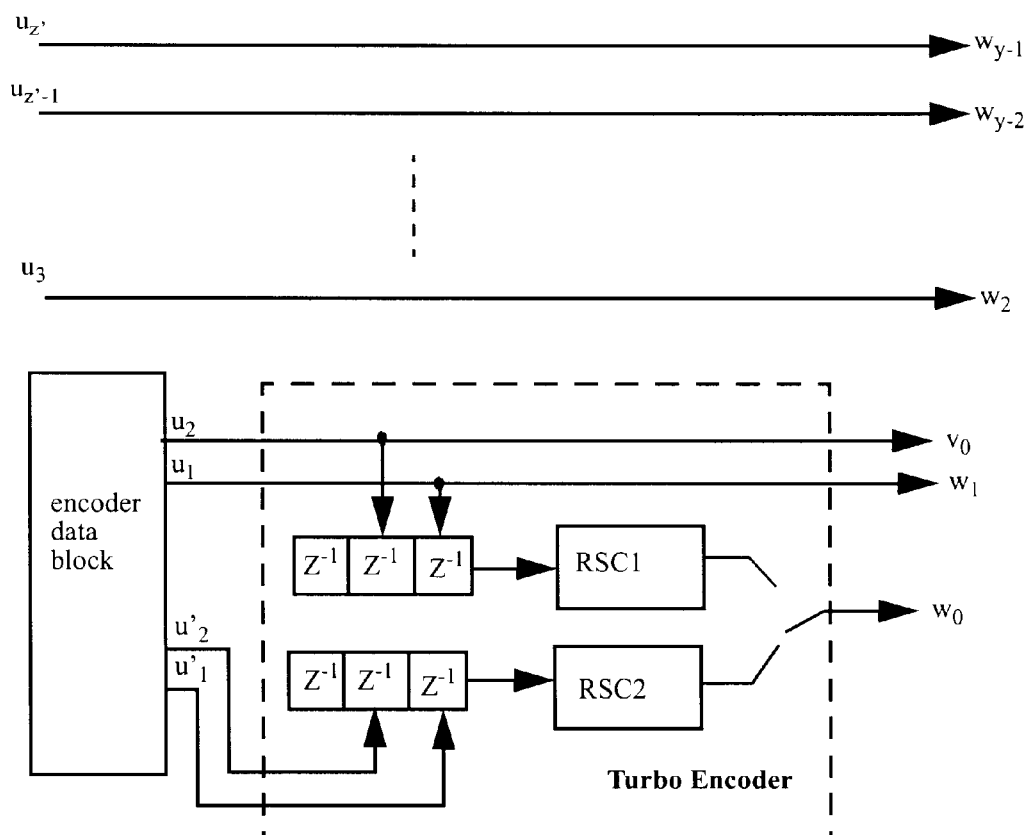
FIG. 2 shows an the encoder structure for x=1 and y>1, where the turbo coding rate is $\frac{2}{3}$.

FIG. 2 shows the encoder structure for x=1 and y>1, where the turbo coding rate is ⅔. For the case y=1 and x>1, the encoder structure, shown in FIG. 3, is similar to that shown in FIG. 2.

Figure 3:
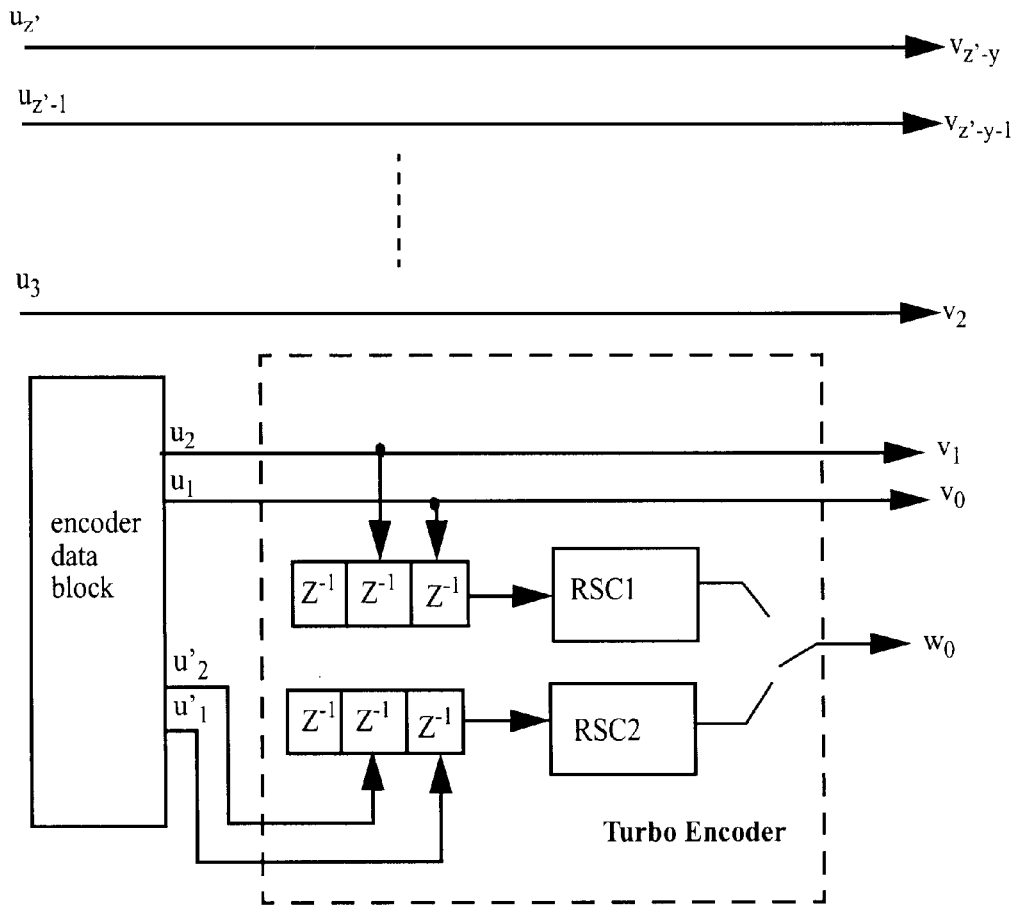
FIG. 3 shows an encoder structure for the case y=1 and x>1.

FIG. 3 shows the encoder structure for the case x=y=1, where the coding rate is ½. For y<1 (or x<1), a similar encoder structure to that shown in FIGS. 1 to 4 can be used depending on the value of x (or y). The only difference is that one bit will be transmitted using K subchannels where y=1/K using a spread code.

If the spread code being used is $[b_1, b_2, \ldots, b_K]$, 0 can be transmitted as $[b_1, b_2, \ldots, b_K]$ where (k=1, 2, ..., K) and 1 is transmitted as $[-b_1, -b_2, \ldots, -b_K]$. The constellation for each subchannel in the K subchannel group uses one bit per channel constellation and the $k^{th}$ channel transmits bit $b_k$. As a whole, K subchannels are required to transmit one data bit. The advantage of such an arrangement is that self cross-talk can be reduced greatly if different spread codes are used for different modems in the same bundle group. Suitable spread codes are described in IEEE Communications Letters, vol. 4, no. 3, pp. 80–82, March 2000, R. V. Sonalkar and R. R. Shively.

Decoder

The decoding procedure for turbo trellis-coded modulation consists of following steps:

1) Soft decode the least significant bit (LSB);
2) Hard decode the most significant bits (MSB).
3) Decode the LSB using a turbo decoder algorithm; and
4) Determine all data bits If an N bit constellation is used for data transmission in a given subchannel, the constellation location can be represented by two dimensional vectors: $X_b=[b_{xM}, b_{x(M-1)}, \ldots, b_{x1}, 1]$ and $Y_b=[b_{yM}, b_{y(M-1)}, \ldots, b_{y1}, 1]$ where M=N/2 for an even number N and M=(N+1)/2 for odd number N. The decoder will be the same for both $X_b$ and $Y_b$.

Let received data be (X, Y). If $(-2^M-1+2k)<X<(-2^M-1+2(k+1))$ where k=0, 1, ..., $2^M-1$, and retaining $X_1=(-2^M-1+2k)$ and $X_2=(-2^M-1+2(k+1))$, whether the final X will take $X_1$ or $X_2$ depends the decoder result from the LSB. For N>1, the soft bit (log probability without a constant) for the LSB in X is determined as $$P_1 = \log(prob(b_{x1}=1)) = \begin{cases} \frac{(X+1)^2}{\sigma^2}, & N=2 \\ \sum_{k=0}^{2^{M-1}} \frac{(X+4k-2^M+3)^2}{\sigma^2}, & \text{otherwise} \end{cases}$$

$$P_0 = \log(prob(b_{x1}=0)) = \begin{cases} \frac{(X-1)^2}{\sigma^2}, & N=2 \\ \sum_{k=0}^{2^{M-1}} \frac{(X+4k-2^M+1)^2}{\sigma^2}, & \text{otherwise} \end{cases}$$

where $\sigma^2$ is the noise power. The soft bit for the LSB in Y can be obtained in a similar way by replacing X with Y in the above equation.

If N=1, the soft bit will be $$P_0 = \log(prob(b_{x1}=0)) = \left(\frac{(X-1)^2}{\sigma^2} + \frac{(Y-1)^2}{\sigma^2}\right)$$

$$P_0 = \log(prob(b_{x1}=0)) = \left(\frac{(X-1)^2}{\sigma^2} + \frac{(Y-1)^2}{\sigma^2}\right)$$

If $N<1$ and the spread code is $[b_1, b_2, \ldots, b_K]$, the soft bit can be calculated as $$P_1 = \log(prob(b_{x1}=0)) = \sum_{k=1}^{K} \left(\frac{(X+b_k)^2}{\sigma^2} + \frac{(Y+b_k)^2}{\sigma^2}\right)$$

$$P_0 = \log(prob(b_{x1}=0)) = \sum_{k=1}^{K} \left(\frac{(X-b_k)^2}{\sigma^2} + \frac{(Y-b_k)^2}{\sigma^2}\right)$$

Figure 5:
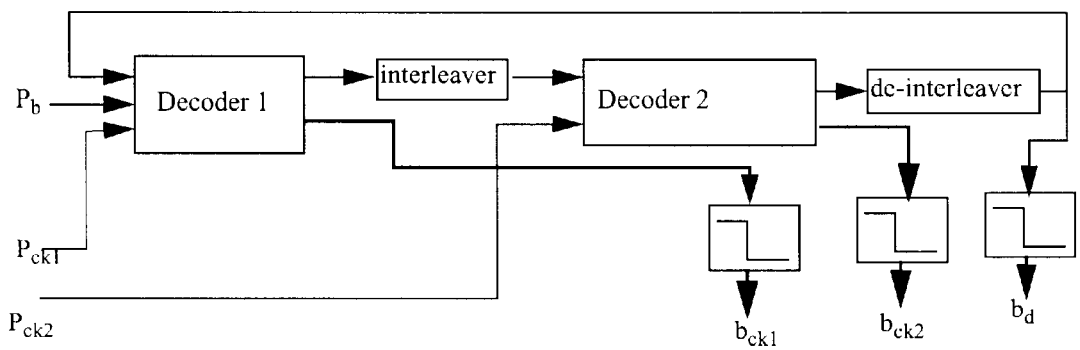
FIG. 5 is a block diagram of the decoder.

The soft bit output is sent to turbo decoder circuit which is shown in FIG. 5. The turbo decoder consists of two LOG-MAP decoders 30, 32. Each contains forward ($\alpha$) iteration, backward ($\beta$) iteration and performs the final soft bit output calculation. The only difference is the output contains not only the data bit but also the error check bit at its last iteration.

The reason that the output of error check bit is required is that the LSB is needed to determine X (or Y) from two possible constellation points $X_1$ and $X_2$ (or $Y_1$ and $Y_2$), while some of these LSBs are error check bits. A detailed example of a turbo decoder can be found in the Sadjapour article referred to above and also in C. Berrou and A., "Near Optimum Error Correcting Coding and Decoding Turbo-Codes", IEEE Trans. on Communications, Vol. 44, No. 10, Oct., 1996.

The soft output error check bits at time k is calculated as $$P_{ck1}=\text{prob}(b_{ck}=1)=\text{MAX}_{(s,\,s')}[\gamma_{ck1}(R_k, s, s')\alpha_{k-1}(s')\beta_k(s)]$$

$$P_{ck0}=\text{prob}(b_{ck}=0)=\text{MAX}_{(s,\,s')}[\gamma_{ck0}(R_k, s, s')\alpha_{k-1}(s')\beta_k(s)]$$

where s is the state of turbo coder at time k and s' is the state at time k−1. $R_k$ represents the received data. $\beta_k(s)$ is the probability at state s (time k) for backward iteration and $\alpha_{k-1}(s')$ represents the probability at state s' (time k−1) for forward iteration. $\gamma_{ck0}(R_k, s, s')$ and $\gamma_{ck1}(R_k, s, s')$ are the probability of transition from state s' to s with received data being $R_k$ and the error check bit being 0 and 1 respectively.

After passing through turbo decoder, the LSBs are determined and if N>1, the MSBs are still to be determined from two possible constellation points. Take X as an example, which has two possible values $X_1$ or $X_2$ (which are two neighbor points in constellation). For two neighboring constellation points, the LSB for $X_1$ and $X_2$ must be different. Therefore, $X_b=[b_{xM}, b_{x(M-1)}, \ldots, b_{x1}, 1]$ can be determined from $X_1$ and $X_2$ by examining its LSB. Similarly $Y_b=[b_{yM}, b_{y(M-1)}, \ldots, b_{y1}, 1]$ can be determined. After $X_b$ and $Y_b$ are determined, the final received data bits are obtained for following three cases:

When N is even, the final bits are $[b_N, b_{N-1}, \ldots, b_1] = [b_{xM}, b_{yM}, b_{x(M-1)}, b_{y(M-1)}, \ldots, b_{x1}, b_{y1}]$.

Figure 6:
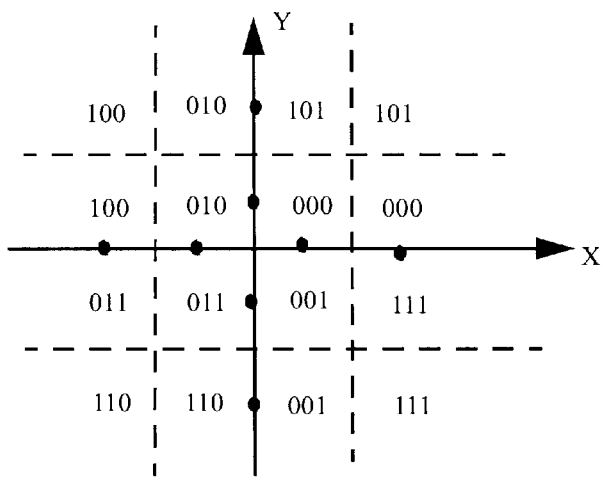
FIG. 6 shows a constellation showing how the final three bits are determined.

If N=3, the final three bits are determined by constellation shown in FIG. 6, which is further tabulated in Table 1.

| $b_{x2}b_{x1}$ | $b_{y2}b_{y1}$ | $b_3b_2b_1$ |
|---|---|---|
| 00 | 00 | 000 |
| 00 | 01 | 101 |
| 00 | 10 | 001 |
| 00 | 11 | 001 |
| 01 | 00 | 000 |
| 01 | 01 | 101 |
| 01 | 10 | 111 |
| 01 | 11 | 111 |
| 10 | 00 | 100 |
| 10 | 01 | 100 |
| 10 | 10 | 110 |
| 10 | 11 | 011 |
| 11 | 00 | 010 |
| 11 | 01 | 010 |
| 11 | 10 | 110 |
| 11 | 11 | 011 |

Figure 7:
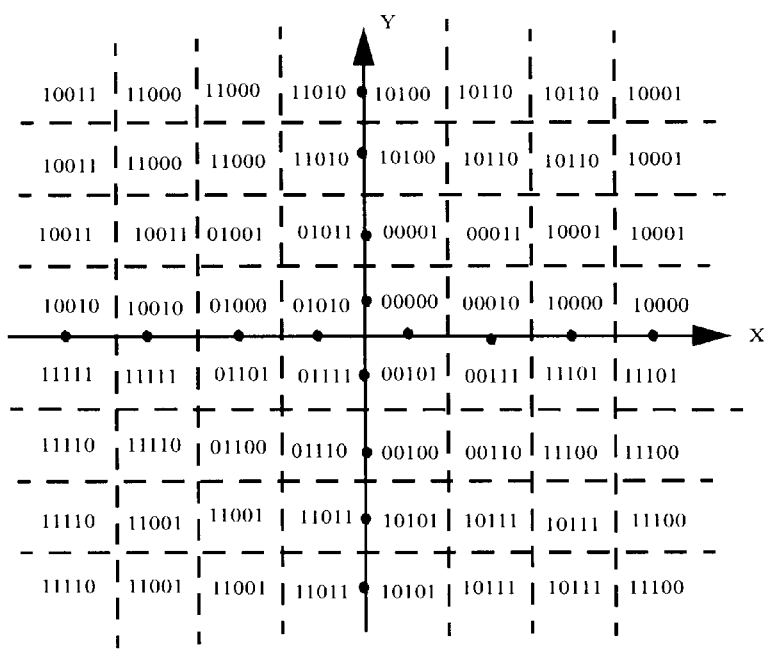
FIG. 7 is a constellation showing the determination of the most significant bits.

If N is an odd number and N>3, the low bit (N−5) can be determined the same way as for even N case, i.e., $[b_{N-5}, b_{N-6}, \ldots, b_1] = [b_{x(M-3)}, b_{y(M-3)}, b_{x(M-4)}, b_{y(M-4)}, \ldots, b_{x1}, b_{y1}]$. The 5 MSBs are determined according to constellation in FIG. 7, which is further tabulated in Table 2.

| $b_{xM}b_{x(M-1)}b_{x(M-2)}$ | $b_{yM}b_{y(M-1)}b_{y(M-2)}$ | $b_N b_{N-1} b_{N-2} b_{N-3} b_{N-4}$ |
|---|---|---|
| 000 | 000 | 00000 |
| 000 | 001 | 00001 |
| 000 | 010 | 10100 |
| 000 | 011 | 10100 |
| 000 | 100 | 10101 |
| 000 | 101 | 10101 |
| 000 | 110 | 00100 |
| 000 | 111 | 00101 |
| 001 | 000 | 00010 |
| 001 | 001 | 00011 |
| 001 | 010 | 10110 |
| 001 | 011 | 10110 |
| 001 | 100 | 10111 |
| 001 | 101 | 10111 |
| 001 | 110 | 00110 |
| 001 | 111 | 00111 |
| 010 | 000 | 10000 |
| 010 | 001 | 10001 |
| 010 | 010 | 10110 |
| 010 | 011 | 10110 |
| 010 | 100 | 10111 |
| 010 | 101 | 10111 |
| 010 | 110 | 11100 |
| 010 | 111 | 11101 |
| 011 | 000 | 10000 |
| 011 | 001 | 10001 |
| 011 | 010 | 10001 |
| 011 | 011 | 10001 |
| 011 | 100 | 11101 |
| 011 | 101 | 11100 |
| 011 | 110 | 11100 |
| 011 | 111 | 11100 |
| 100 | 000 | 10010 |
| 100 | 001 | 10011 |
| 100 | 010 | 10011 |
| 100 | 011 | 10011 |
| 100 | 100 | 11110 |
| 100 | 101 | 11110 |
| 100 | 110 | 11110 |
| 100 | 111 | 11111 |
| 101 | 000 | 10010 |
| 101 | 001 | 10011 |
| 101 | 010 | 11000 |
| 101 | 011 | 11000 |
| 101 | 100 | 11001 |
| 101 | 101 | 11001 |
| 101 | 110 | 11110 |
| 101 | 111 | 11111 |
| 110 | 000 | 01000 |
| 110 | 001 | 01001 |
| 110 | 010 | 11000 |
| 110 | 011 | 11000 |
| 110 | 100 | 11001 |
| 110 | 101 | 11001 |
| 110 | 110 | 01100 |
| 110 | 111 | 01101 |
| 111 | 000 | 01010 |
| 111 | 001 | 01011 |
| 011 | 010 | 11010 |
| 111 | 011 | 11010 |
| 111 | 100 | 11011 |
| 111 | 101 | 11011 |
| 111 | 110 | 01110 |
| 111 | 111 | 01111 |

It will be appreciated that the use of a turbo code as described in combination with a trellis code permits the achievement of better performance than is possible with currently used trellis codes. When a spread spectrum algorithm is combined with turbo-trellis coded modulation, it is possible to use channels carrying less than one bit of information, resulting in a great increase in channel capacity.

The described blocks can be implemented in a digital signal processor using standard DSP techniques known to persons skilled in the art.

I claim:

1. A method of transmitting data over a plurality of sub-channels in a communications channel, comprising receiving an incoming bit stream, passing at least some of said bits through a turbo encoder to generate turbo encoded output bits, and generating output words corresponding to symbol points on a constellation in a trellis code modulation scheme using at least said bits passed through said turbo encoder, and wherein for at least some of said sub-channels the constellation symbol points contain less than one bit, and for such sub-channels a whole bit is transmitted over K sub-channels using spread code.

2. A method as claimed in claim 1, wherein said bits passed through the turbo encoder are the least significant bits (LSBs) of the incoming data and the most significant bits are passed directly as an output word.

3. A method as claimed in claim 1, wherein a portion of the incoming bit stream is fed to a memory, and interleaved groups of bits from said memory are fed to recursive systematic convolutional encoders to create said turbo encoded output bits.

4. A method as claimed in claim 1, wherein said communications channel forms part of a discrete multitone (DMT) communications system.

5. A method as claimed in claim 1, wherein for at least some of said sub-channels the constellation symbol points contain less than one bit, and for such sub-channels a whole bit is transmitted over K sub-channels using spread code.

6. A method as claimed in any one of claims 1 to 5, wherein said words include error check bits.

7. A method as claimed in claim 1, wherein said words are used to obtain the constellation points from en encoder look-up table.

8. An encoder for encoding an incoming data stream for transmission over a communications channel including a plurality of sub-channels, comprising an encoder data block for storing a portion of the incoming data stream, a first recursive systematic convolutional encoder receiving sequential data from the encoder data block, and a second recursive systematic convolutional encoder for receiving interleaved data from the encoder data block, said convolutional encoders outputting at least the least significant bit of an output data word forming a symbol point on a constellation in a trellis code modulation scheme for transmission over K said sub-channels using spread code.

9. An encoder as claimed in claim 8, further comprising a shift register connected to the input of each recursive systematic convolutional encoder, each cell of said shift register receiving a respective bit from said encoder data block.

10. An encoder as claimed in claim 8, wherein for x=y=1, where x and y are the number of bits in each point of two constellations, the inputs of said recursive systematic convolutional encoder are connected directly to said encoder data block.

11. A method of decoding a turbo trellis code modulated signal, comprising:
  (i) soft decoding the received signal for the least significant bits;
  (ii) hard decoding the input signal for the most significant bits;
  (iii) decoding the least significant bit using a turbo decoder algorithm; and
  (iv) determining all the data bits.

12. A method as claimed in claim 11, wherein the received signal is processed to determine the soft bit (log probability without a constant) for the LSB as $$P_1 = \log(prob(b_{xI} = 1)) = \begin{cases} \dfrac{(X+1)^2}{\sigma^2}, & N = 2 \\ \displaystyle\sum_{k=0}^{2^{M-1}} \dfrac{(X + 4k - 2^M + 3)^2}{\sigma^2}, & \text{otherwise} \end{cases}$$

$$P_0 = \log(prob(b_{xI} = 0)) = \begin{cases} \dfrac{(X-1)^2}{\sigma^2}, & N = 2 \\ \displaystyle\sum_{k=0}^{2^{M-1}} \dfrac{(X + 4k - 2^M + 1)^2}{\sigma^2}, & \text{otherwise} \end{cases}$$

where $\sigma^2$ is the noise power.

13. A method as claimed in claim 12, wherein the soft bit is passed to a turbo decoder to generate a data bit and error check bit.

14. A method as claimed in claim 13, wherein after determination of the LSBs, the MSBs are determined from possible constellation points by examining the LSBs.

15. A method as claimed in claim 11, wherein an LSB and MSB decoder is combined for different constellations.

* * * * *